United States Patent
Nguyen

(10) Patent No.: US 10,977,882 B1
(45) Date of Patent: Apr. 13, 2021

(54) DRIVER HEALTH PROFILE

(71) Applicant: Lytx, Inc., San Diego, CA (US)

(72) Inventor: Vincent Nguyen, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 195 days.

(21) Appl. No.: 16/162,648

(22) Filed: Oct. 17, 2018

(51) Int. Cl.
G07C 5/08 (2006.01)
B60W 40/09 (2012.01)
G06K 9/00 (2006.01)
G07C 5/00 (2006.01)
B60W 40/10 (2012.01)

(52) U.S. Cl.
CPC ............ *G07C 5/085* (2013.01); *B60W 40/09* (2013.01); *B60W 40/10* (2013.01); *G06K 9/00791* (2013.01); *G07C 5/008* (2013.01)

(58) Field of Classification Search
CPC ...... B60W 40/09; B60W 40/10; B60W 40/12; G07C 5/085
See application file for complete search history.

(56) References Cited

U.S. PATENT DOCUMENTS

| 7,343,306 | B1 * | 3/2008 | Bates | G06Q 40/08 701/32.4 |
| 7,769,499 | B2 * | 8/2010 | McQuade | G07C 5/008 701/1 |
| 8,996,234 | B1 * | 3/2015 | Tamari | G07C 5/085 701/29.3 |
| 9,315,195 | B2 * | 4/2016 | Armitage | G07C 5/0816 |
| 2006/0053038 | A1 * | 3/2006 | Warren | G06Q 40/08 705/4 |
| 2007/0239322 | A1 * | 10/2007 | McQuade | G07C 5/008 701/1 |
| 2014/0199662 | A1 * | 7/2014 | Armitage | B60K 35/00 434/65 |
| 2017/0076395 | A1 * | 3/2017 | Sedlik | G08G 1/012 |

* cited by examiner

*Primary Examiner* — Thomas G Black
*Assistant Examiner* — Tarek Elarabi
(74) *Attorney, Agent, or Firm* — Van Pelt, Yi & James LLP

(57) ABSTRACT

A system for driver health profiling includes an interface and a processor. The interface is configured to receive a sensor data from a vehicle event recorder. The processor is configured to determine a maneuver characteristic based at least in part on the sensor data; determine a maneuver statistic based at least in part on the maneuver characteristic; and provide an indication based at least in part on the maneuver statistic.

17 Claims, 12 Drawing Sheets

DRIVER HEALTH PROFILE

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, global positioning system (GPS), etc., that report data, which is used to determine the occurrence of an anomalous event. In addition to anomalous events, anomalous behavior can be detected. For example, as the brakes of a vehicle wear out its measurable stopping characteristics change, and as the tires wear out its measurable cornering characteristics change. However, for an employer or entity, the vehicle by itself does not provide a complete characterization of its fleet.

BRIEF DESCRIPTION OF THE DRAWINGS

Various embodiments of the invention are disclosed in the following detailed description and the accompanying drawings.

DETAILED DESCRIPTION

Figure 1:
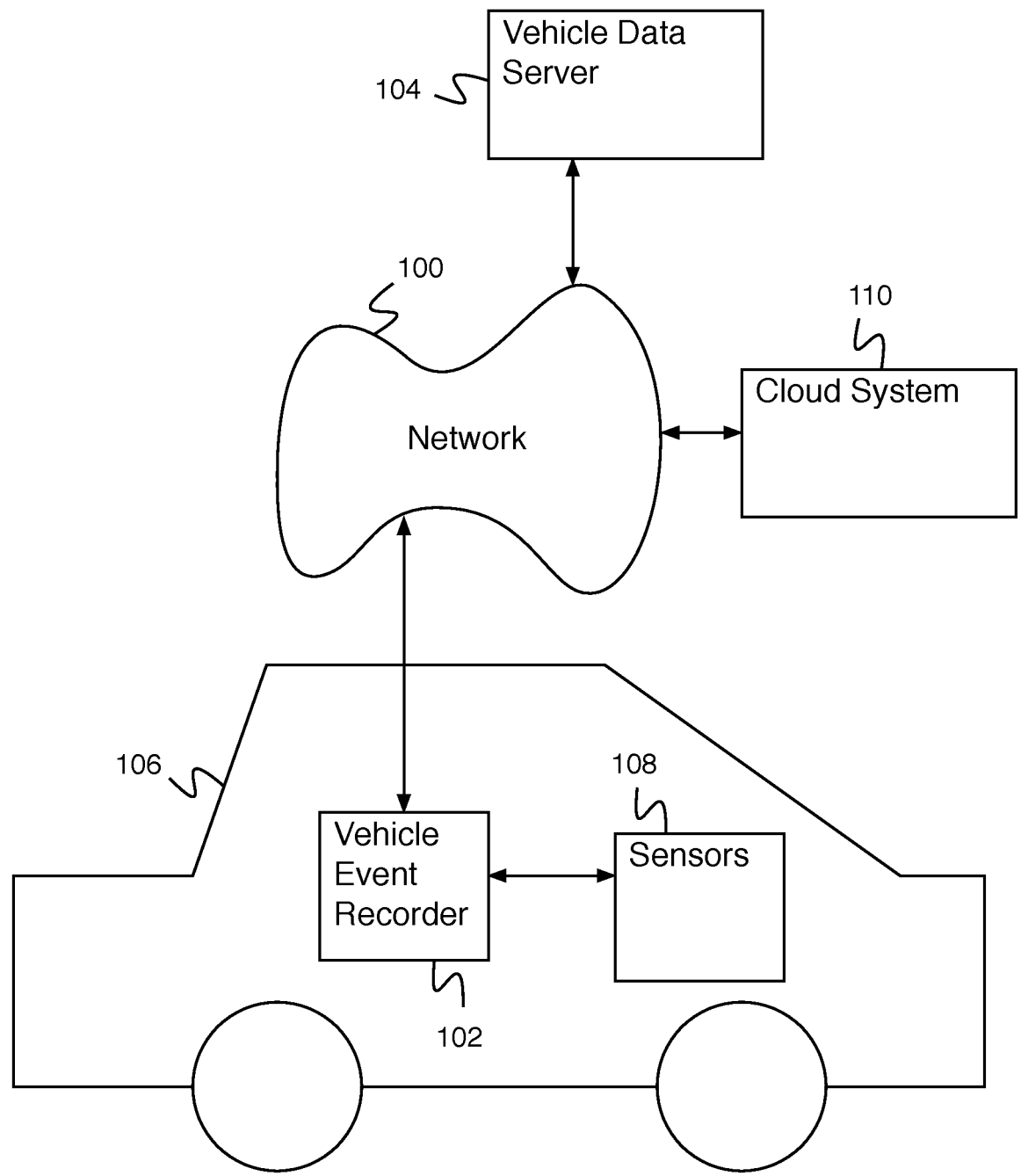
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system comprises an interface configured to receive a sensor data from a vehicle event recorder, and a processor configured to determine a maneuver characteristic based at least in part on the sensor data, determine a maneuver statistic based at least in part on the maneuver characteristic, and provide an indication based at least in part on the maneuver statistic.

Driver health monitoring is disclosed. A system comprises a vehicle event recorder configured to monitor a set of maneuvers. For example, the set of maneuvers comprises cornering, stopping at a stop sign or traffic light, driving on the highway, etc. The system measures maneuver data (e.g., speedometer data, braking system data, global positioning system (GPS) data, etc.) to determine maneuver characteristics. For example, maneuver characteristics comprise deviations from optimal maneuver behavior. Maneuver statistics can be determined by comparing determined maneuver characteristics to determined maneuver characteristics associated with similar users. Maneuver statistics are analyzed to determine whether driver behaviors fall outside of fleet wide driver norms. Maneuver characteristics for a driver can additionally be tracked to determine whether the driver behavior is varying from the norm for the driver. A determination that a set of driver maneuver characteristics for a driver varies far from a statistical norm for other similar drivers or varies from an established norm for the driver comprises a determination that the driver health should be checked.

For example, driving maneuvers measured to gauge driver health comprise reaction time to a required sudden stop; reaction time to act on a sudden yellow light; ability to maintain consistent following distance, ability to stay with the flow of traffic; modulation of the brake pad for typical stops; vehicle path of lane changes; vehicle timing of lane changes; frequency of traffic violations; ability to stay on the correct path during a turn; ability to stay in the middle of the lane on straight paths; time to go from alert driving state to drowsy driving state. Key summary data is visualized for a user, for example an average and trends for metrics on the above driving maneuvers. Drivers are statistically compared to their peers, by vehicle type, driver demographic, employer type, etc. For example, the data is used to construct a predictive score describing the ability of the driver to correctly operate the vehicle. Driving maneuver data and summary data can additionally be used to adjust triggering thresholds for detecting anomalous events or to detect anomalous driving periods directly. For example, triggering thresholds are adjusted to be more sensitive in the event that the driver health is worsening and triggering thresholds are adjusted to be less sensitive in the event that the driver health is getting better. In some embodiments, the driver health is monitored (e.g., the various measures of driver health are used to determine composite or individual index); in the event that the driver health improves (e.g., the index goes up), the trigger threshold(s) is/are made less sensitive so that data is taken less frequently; In the event that the driver health worsens (e.g., the index goes down), the trigger threshold(s) is/are made more sensitive so that data is taken more frequently.

The system improves the computer system by utilizing a set of sensors already being used for tracking and liability reduction to gauge driver health. The system improves computer functionality by making the system more effective for monitoring drivers by providing information enabling determining statistics and/or graphic feedback to a user and/or an indication related to driver health, determining better system monitoring thresholds or triggers, FIG. 1 is a block diagram illustrating an embodiment of a system including a vehicle event recorder. In the example shown, vehicle event recorder 102 is mounted in a vehicle (e.g., a car, a truck, a trailer associated with a semi truck, a van, a bus, a commercial vehicle, etc.). Vehicle event recorder 102 is in communication with sensors 108. Sensors 108 comprises a set of sensors—for example, one or more video recorders, audio recorders, accelerometers, gyroscopes, vehicle sensors, proximity sensors, a GPS, outdoor temperature sensors, moisture sensors, laser line tracker sensors, sound navigation and ranging systems (e.g., SONARs), light detection and ranging systems (e.g., LIDARs), range finder sensors, etc. Vehicle sensors comprise internal vehicle sensors—for example, a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. Vehicle event recorder 102 comprises a system for receiving and processing sensor data. In some embodiments, vehicle event recorder 102 captures data (e.g., collects data, stores received data, etc.) in response to a trigger—for example, a trigger associated with a trigger threshold. Capturing data in response to a trigger comprises receiving data, processing the data, determining to capture more data (e.g., by determining that a processed data value is greater than a threshold), and capturing the more data.

Processing sensor data comprises filtering data, identifying patterns in data, detecting events, etc. Vehicle event recorder 102 is mounted on vehicle 106 in any appropriate location—for example, the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components. Vehicle event recorder 102 comprises a communications system for communicating with network 100. Network 100 comprises a network for communications. In various embodiments, network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks, for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night).

Vehicle event recorder 102 communicates with vehicle data server 104 and cloud system 110 via network 100. Vehicle data server 104 receives data, processes data, stores data, requests more data, provides stored data, etc. For example, vehicle data server 104 comprises a system for receiving a sensor data from vehicle event recorder 102, determining a maneuver characteristic based at least in part on the sensor data, determining a maneuver statistic based at least in part on the maneuver characteristic, and providing an indication based at least in part on the maneuver statistic.

Figure 2:
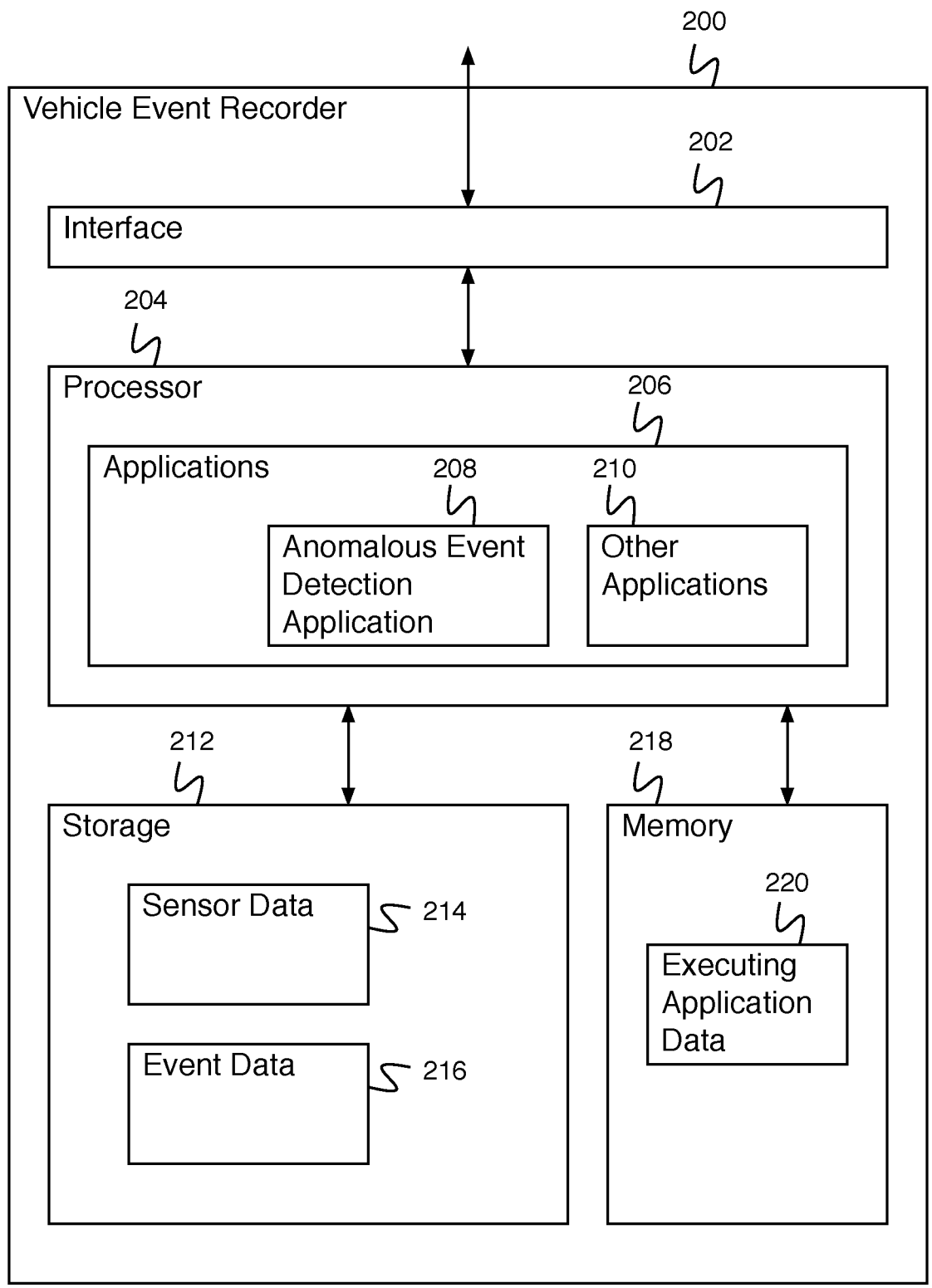
FIG. 2 is a block diagram illustrating an embodiment of a vehicle event recorder.

FIG. 2 is a block diagram illustrating an embodiment of a vehicle event recorder. In some embodiments, vehicle event recorder 200 comprises vehicle event recorder 102 of FIG. 1. In the example shown, vehicle event recorder 200 comprises interface 202. Interface 202 comprises an interface for communicating with external systems using a network. For example, interface 202 comprises an interface for communicating with a vehicle data server (e.g., for providing sensor data, for providing indications of anomalous events, etc.), a cloud system, etc. Processor 204 comprises a processor for executing applications 206. Applications 206 comprise anomalous event detection application 208 and other applications 210. Anomalous event detection application 208 comprises an application for receiving sensor data and detecting anomalous events (e.g., by processing data, determining when data crosses a threshold, using machine learning, etc.). Other applications 210 comprise any other appropriate applications (e.g., a data collection application, a data viewing application, a driver health determination application, a data analysis application, etc.). Vehicle event recorder 200 additionally comprises storage 212. Storage 212 comprises sensor data 214 and event data 216. Sensor data comprises data collected by one or more sensors (e.g., sensors 108 of FIG. 1). Vehicle event recorder 200 additionally comprises memory 218. Memory 218 comprises executing application data 220 comprising data associated with applications 206.

Figure 3:
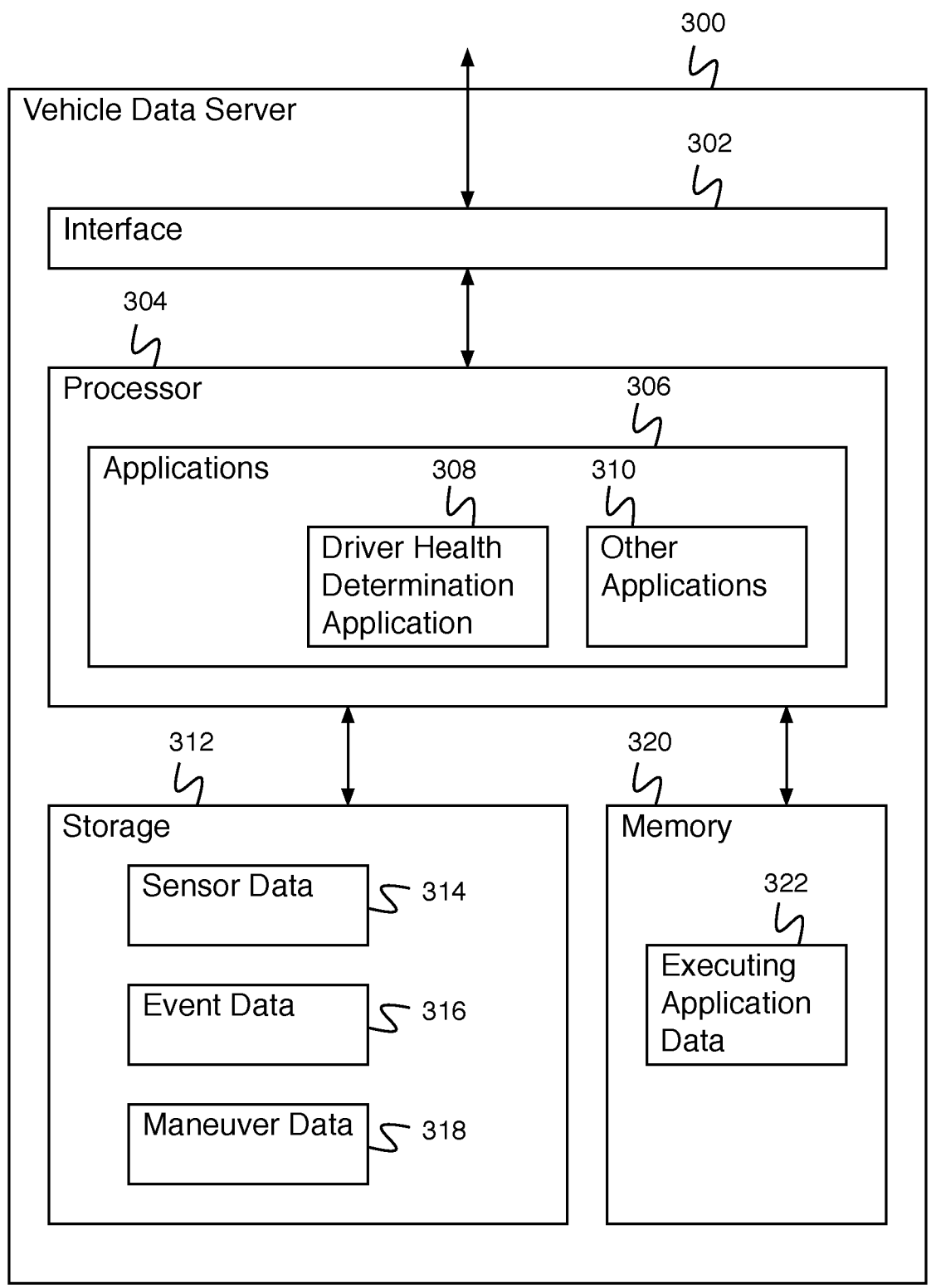
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 comprises interface 302. Interface 302 comprises an interface for communicating with external systems using a network. For example, interface 302 comprises an interface for communicating with a vehicle event recorder (e.g., for receiving sensor data, for receiving event data, etc.), an administrator system, a user system, etc. Processor 304 comprises a processor for executing applications 306. Applications 306 comprises driver health determination application 308 and other applications 310. For example, driver health determination application 308 comprises an application for determining a maneuver characteristic based at least in part on sensor data, determining a maneuver statistic based at least in part on the maneuver characteristic, and providing an indication based at least in part on the maneuver statistic. Other applications 310 comprises any other appropriate applications (e.g., a communications application, a data storage and retrieval application, a user interface application, a data analysis application, a data triggering application, anomalous event detection, etc.). Vehicle data server 300 additionally comprises storage 312. Storage 312 comprises sensor data 314, event data 316, and maneuver data 318. Sensor data 314 comprises data collected by one or more sensors (e.g., sensors 108 of FIG. 1). Event data 316 comprises anomalous event data (e.g., determined by processor 304 or determined by a vehicle event recorder and provided to vehicle data server 300). Maneuver data 318 comprises data describing vehicle maneuvers (e.g., determined by driver health determination application 308 by processing sensor data 314). Vehicle data server 300 additionally comprises memory 320. Memory 320 comprises executing application data 322 comprising data associated with applications 306.

Figure 4:
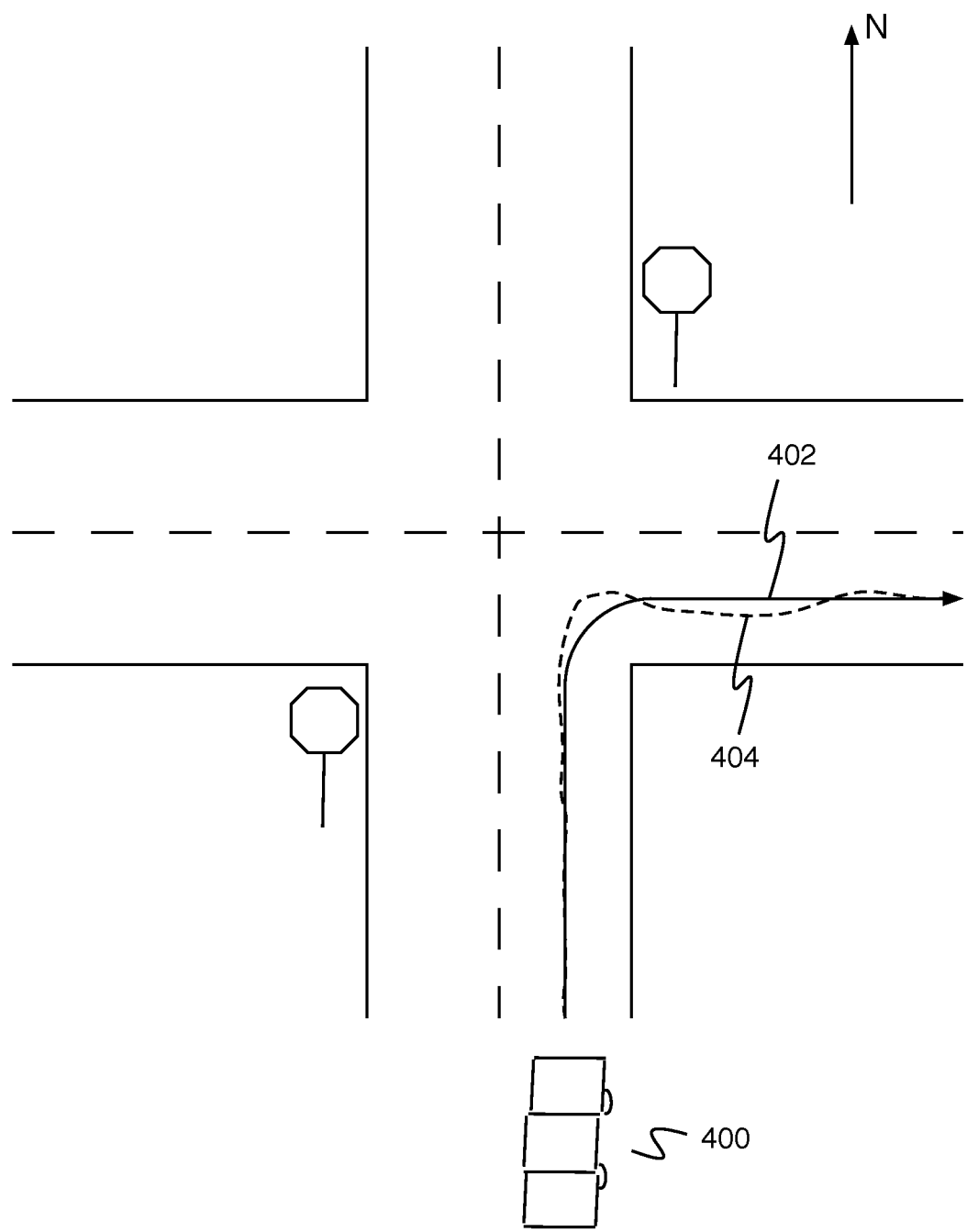
FIG. 4 is a diagram illustrating an embodiment of a cornering maneuver.

FIG. 4 is a diagram illustrating an embodiment of a cornering maneuver. In some embodiments, vehicle 400 comprises vehicle 106 of FIG. 1. In the example shown, vehicle 400 enters the intersection from the south side, turns right, and drives off to the east. The east-west direction of the intersection is controlled with stop signs, the north-south direction is not controlled. An optimal maneuver for the right turn is shown with solid line 402, and an actual maneuver as executed by a driver is shown with dashed line 404. In the example shown, the driver overshoots the curve slightly and weaves to recover. A maneuver characteristic can be determined based on the optimal maneuver and the actual maneuver—for example, by determining the area between solid line 402 and dashed line 404, by determining the maximum deviation between solid line 402 and dashed line 404, by determining the average deviation between solid line 402 and dashed line 404, etc. Optimal maneuver data describing solid line 402 is determined based on a stored map description of the intersection, on a camera image of the intersection as vehicle 400 approaches, the road speed limit, average driver data for the maneuver, etc. Actual maneuver data describing dashed line 404 comprises GPS data, video data, steering wheel data, speedometer data, braking data, etc.

Figure 5:
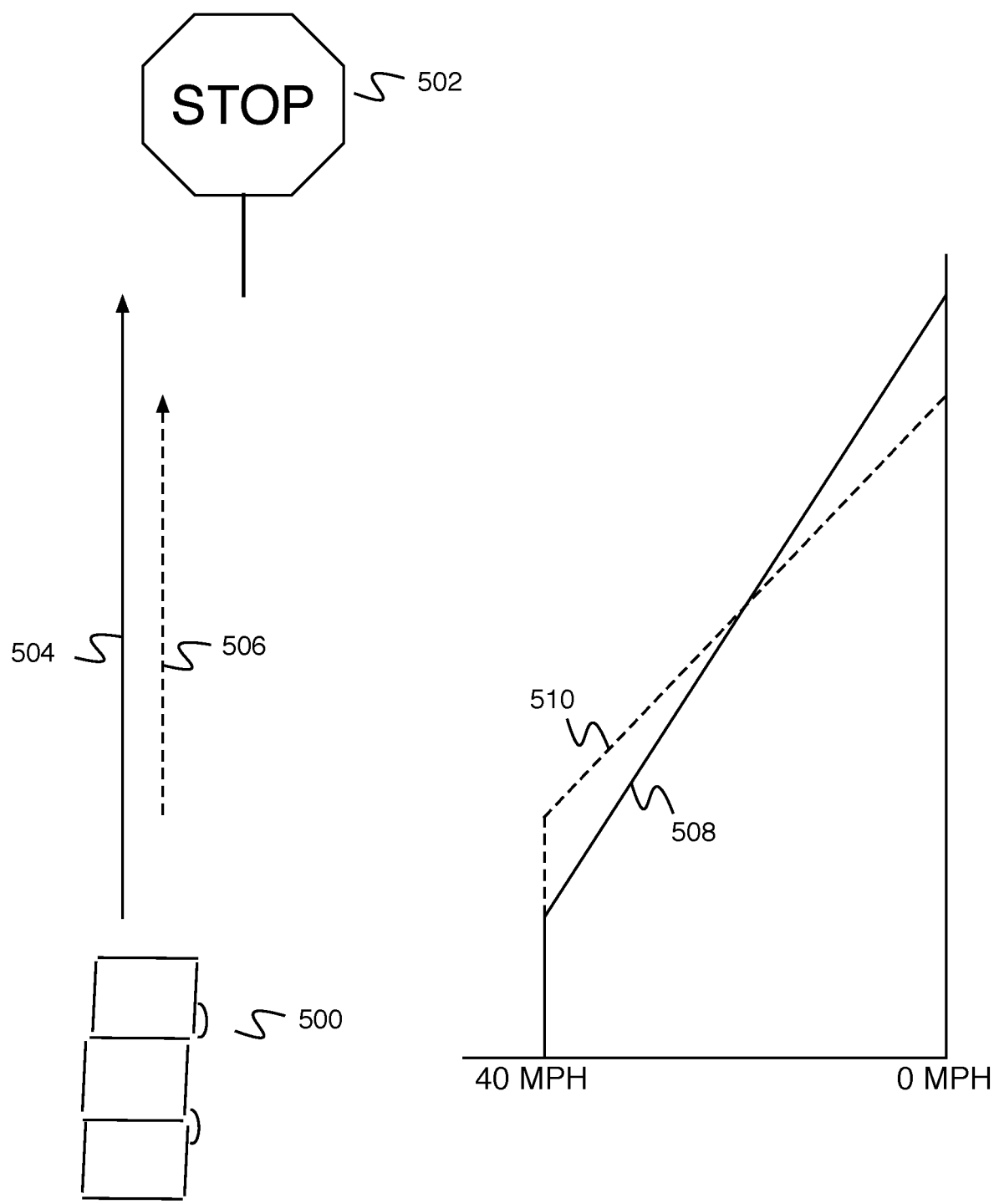
FIG. 5 is a diagram illustrating an embodiment of a stopping maneuver.

FIG. 5 is a diagram illustrating an embodiment of a stopping maneuver. In some embodiments, vehicle 500 comprises vehicle 106 of FIG. 1. In the example shown, vehicle 500 slows and stops at stop sign 502. An optimal maneuver for the stopping maneuver is shown with solid line 502, and an actual maneuver as executed by a driver is shown with dashed line 504. The speed for vehicle 500 for the optimal maneuver is shown by solid line 508 and the speed for vehicle 500 for the actual maneuver is shown by dashed line 510. In the example shown, the driver waits too long to start slowing down for stop sign 502 and stops too quickly. A maneuver characteristic can be determined based on the optimal maneuver and the actual maneuver, for example, by determining the area between solid line 508 and dashed line 510, the difference in maximum slope of solid line 508 and dashed line 510, the difference in length of solid line 504 and dashed line 506, etc. Optimal maneuver data describing solid line 504 and solid line 508 is determined based on the road speed limit, a stopping distance guideline, average driver data for the maneuver, etc. Actual maneuver data describing dashed line 506 and dashed line 510 comprises GPS data, video data (e.g., video data of a stop sign, video data of intersection traffic, etc.), speedometer data, braking data, etc.

Figure 6:
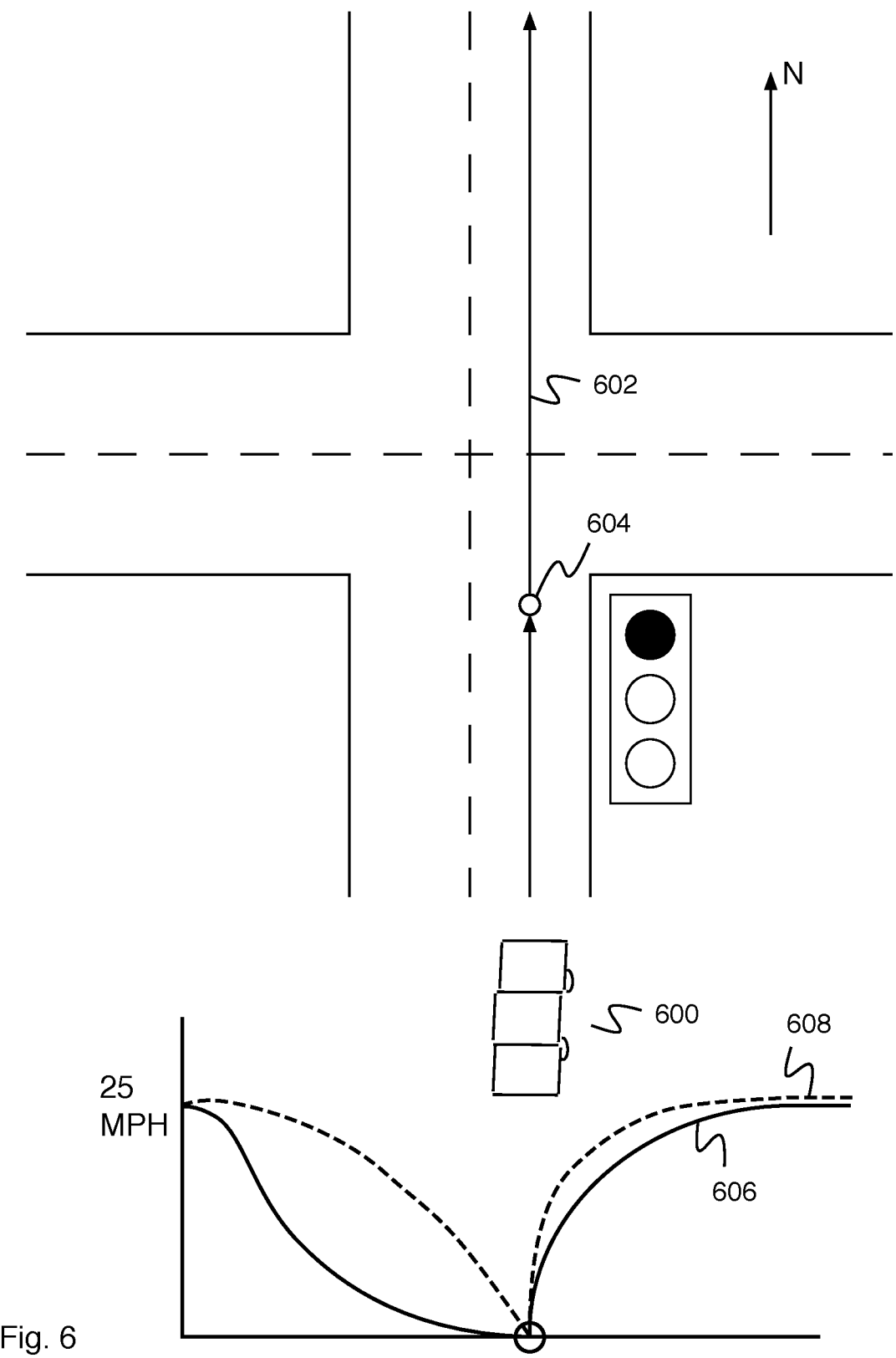
FIG. 6 is a diagram illustrating an embodiment of a stopping maneuver.

FIG. 6 is a diagram illustrating an embodiment of a stopping maneuver. In some embodiments, vehicle 600 comprises vehicle 106 of FIG. 1. In the example shown, vehicle 600 enters the intersection from the south side, stops for a traffic light at position 604, and then exits the intersection to the north after the light changes. The vehicle maneuver is shown by solid line 602. The speed for vehicle 600 for the optimal maneuver is shown by solid line 606 and the speed for vehicle 600 for the actual maneuver is shown by dashed line 608. In the example shown, the driver waits too long to start slowing down for the traffic light and stops too quickly. Once the traffic light changes, the driver starts too rapidly and eventually settles on slightly too fast of a speed. A maneuver characteristic can be determined based on the optimal maneuver and the actual maneuver—for example, by determining the area between solid line 606 and dashed line 608, by determining the maximum deviation between solid line 606 and dashed line 608, by determining the average deviation between solid line 606 and dashed line 608, etc. Optimal maneuver data describing solid line 606 is determined based on a stored map description of the intersection, on a camera image of the intersection as vehicle 600 approaches, the road speed limit, a stopping distance guideline, a current traffic level, average driver data for the maneuver (e.g., average reaction time to braking, average reaction time to accelerating, etc.), etc. Actual maneuver data describing dashed line 608 comprises GPS data, video data (e.g., video data of a traffic light), speedometer data, braking data, reaction time data to breaking response to a yellow or red light, reaction time data to accelerating response to a green light, etc.

Figure 7:
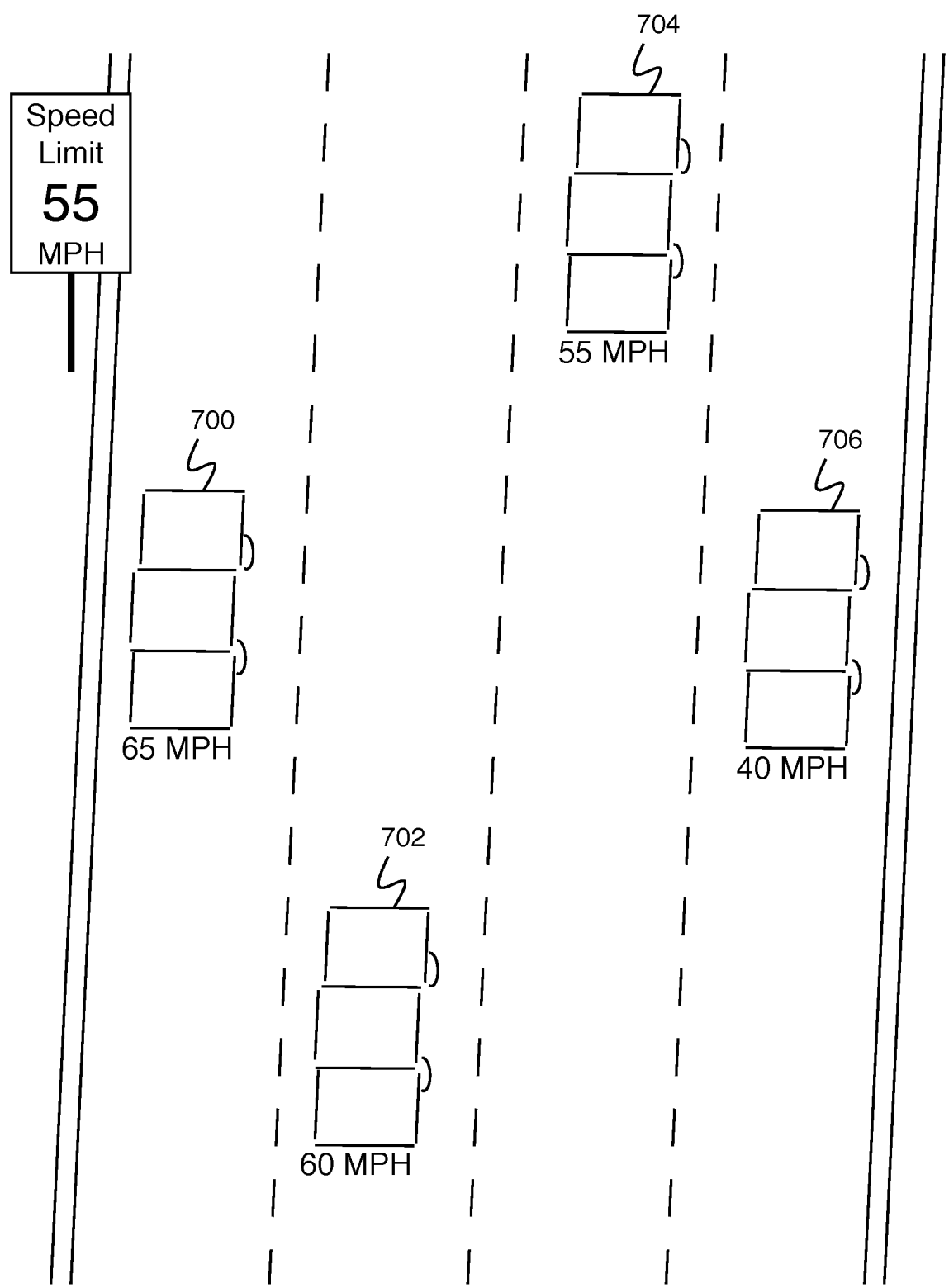
FIG. 7 is a diagram illustrating an embodiment of a freeway driving maneuver.

FIG. 7 is a diagram illustrating an embodiment of a freeway driving maneuver. In some embodiments, one or more of vehicle 700, vehicle 702, vehicle 704, and vehicle 706 comprises vehicle 106 of FIG. 1. In the example shown, vehicle 700, vehicle 702, vehicle 704, and vehicle 706 travel on a freeway with a speed limit of 55 MPH. Vehicle 700 travels at 65 MPH, vehicle 702 travels at 60 MPH, vehicle 704 travels at 55 MPH, and vehicle 706 travels at 40 MPH. A maneuver characteristic can be determined based on the optimal speed and the actual speed—for example, by determining the difference between the optimal speed and the actual speed, by determining the ratio of the optimal speed and the actual speed, by determining a nonlinear function of the optimal speed and the actual speed, etc. An optimal speed is determined based on a speed guideline (e.g., the posted speed limit, 3 MPH below the posted speed limit, 0.95 times the posted speed limit, etc.), based on a current traffic level, average driver data for the maneuver, etc. Actual speed data is comprises GPS data, video data, speedometer data, etc. A maneuver characteristic can be determined based on the optimal driving behavior and the actual driving behavior—for example, by determining the difference between the optimal driving behavior and the actual driving behavior, by determining the ratio of the optimal driving behavior and the actual driving behavior, by determining a nonlinear function of the optimal driving behavior and the actual driving behavior, etc. Optimal driving behavior is determined based on average driving behavior (e.g., average speed, average number of car passings, average number of accelerations/decelerations, average lane change behavior (e.g., number or frequency of lane changes), etc.). Actual driving behavior is determined based on GPS data, video data, speedometer data, etc. and derived measures of car speed, car passings, accelerations/decelerations, lane change behaviors (e.g., number of frequency of lane changes), etc.

Figure 8:
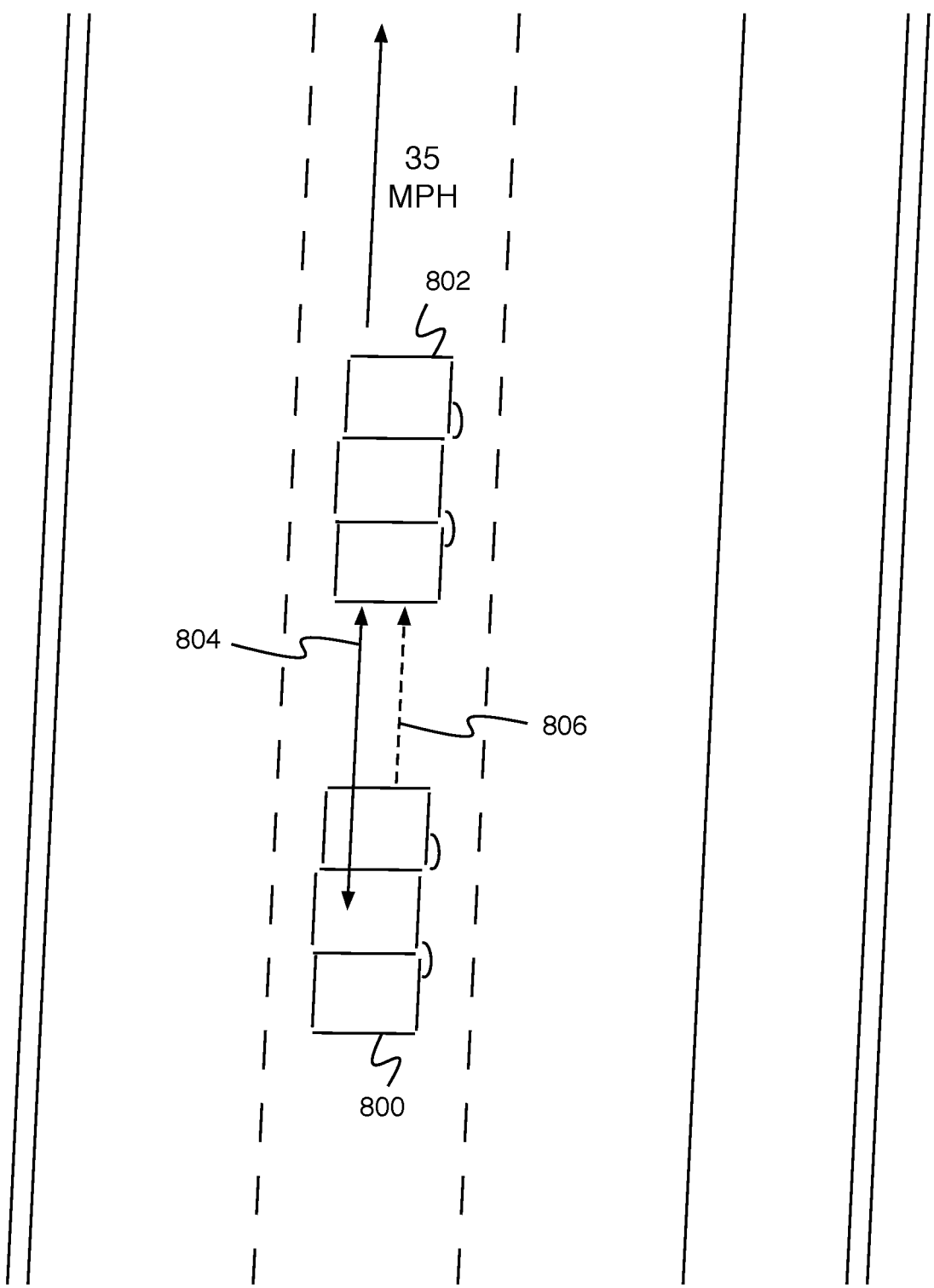
FIG. 8 is a diagram illustrating an embodiment of a following maneuver.

FIG. 8 is a diagram illustrating an embodiment of a following maneuver. In some embodiments, vehicle 800 comprises vehicle 106 of FIG. 1. In the example shown, vehicle 800 is following vehicle 802 at 35 MPH. The following distance for the optimal maneuver is shown by solid line 804 and the following distance for the actual maneuver is shown by dashed line 806. In the example shown, vehicle 800 is following vehicle 802 too closely. A maneuver characteristic can be determined based on the optimal following distance and the actual following distance—for example, by determining the difference between the optimal following distance and the actual following distance, by determining the ratio of the optimal following distance and the actual following distance, by determining a nonlinear function of the optimal following distance and the actual following distance, etc. An optimal following distance is determined based on a following distance guideline (e.g., based on a function of the current travel speed, based on a minimum acceptable following distance, etc.), based on a current traffic level, average driver data for the maneuver, etc. Actual following distance data comprises video data, LIDAR data, SONAR data, range finder data (e.g., range finder data to vehicles ahead), etc.

Figure 9:
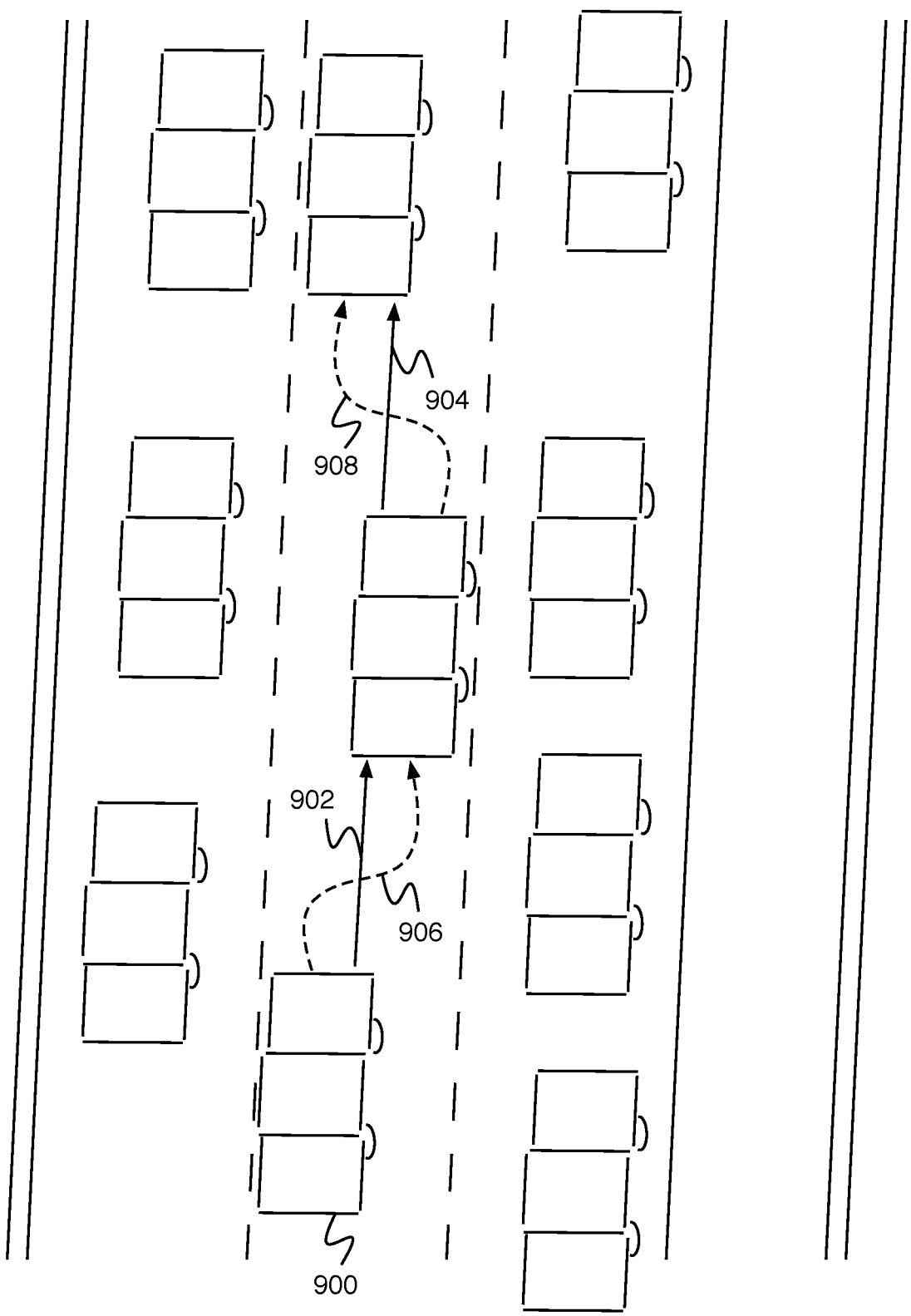
FIG. 9 is a diagram illustrating an embodiment of a freeway driving maneuver.

FIG. 9 is a diagram illustrating an embodiment of a freeway driving maneuver. In some embodiments, vehicle 900 comprises vehicle 106 of FIG. 1. In the example shown, vehicle 900 and other vehicles travel on a freeway. Vehicle 900 is shown in three positions as it travels in the lane. An optimal maneuver for the freeway driving maneuver is shown with solid line 902 and solid line 904, and an actual maneuver as executed by a driver is shown with dashed line 906 and dashed line 908. In the example shown, the driver weaves to the left and to the right of the lane while traveling on the freeway. A maneuver characteristic can be determined based on the optimal maneuver and the actual maneuver— for example, by determining the area between solid line 902 and dashed line 906 and the area between solid line 904 and dashed line 908, by determining the maximum deviation between solid line 902 and dashed line 906 and the maximum deviation between solid line 904 and dashed line 908, by determining the average deviation between solid line 902 and dashed line 906 and the average deviation between solid line 904 and dashed line 908, etc. Optimal maneuver data describing solid line 902 and solid line 904 can be determined based on the road geometry, upcoming turns or lane changes, etc. Actual maneuver data describing dashed line 906 and dashed line 908 comprises GPS data, video data, steering wheel data, speedometer data, braking data, range finder data (e.g., range finder data to vehicles in adjacent lanes, range finder data to vehicles behind), etc.

Figure 10:
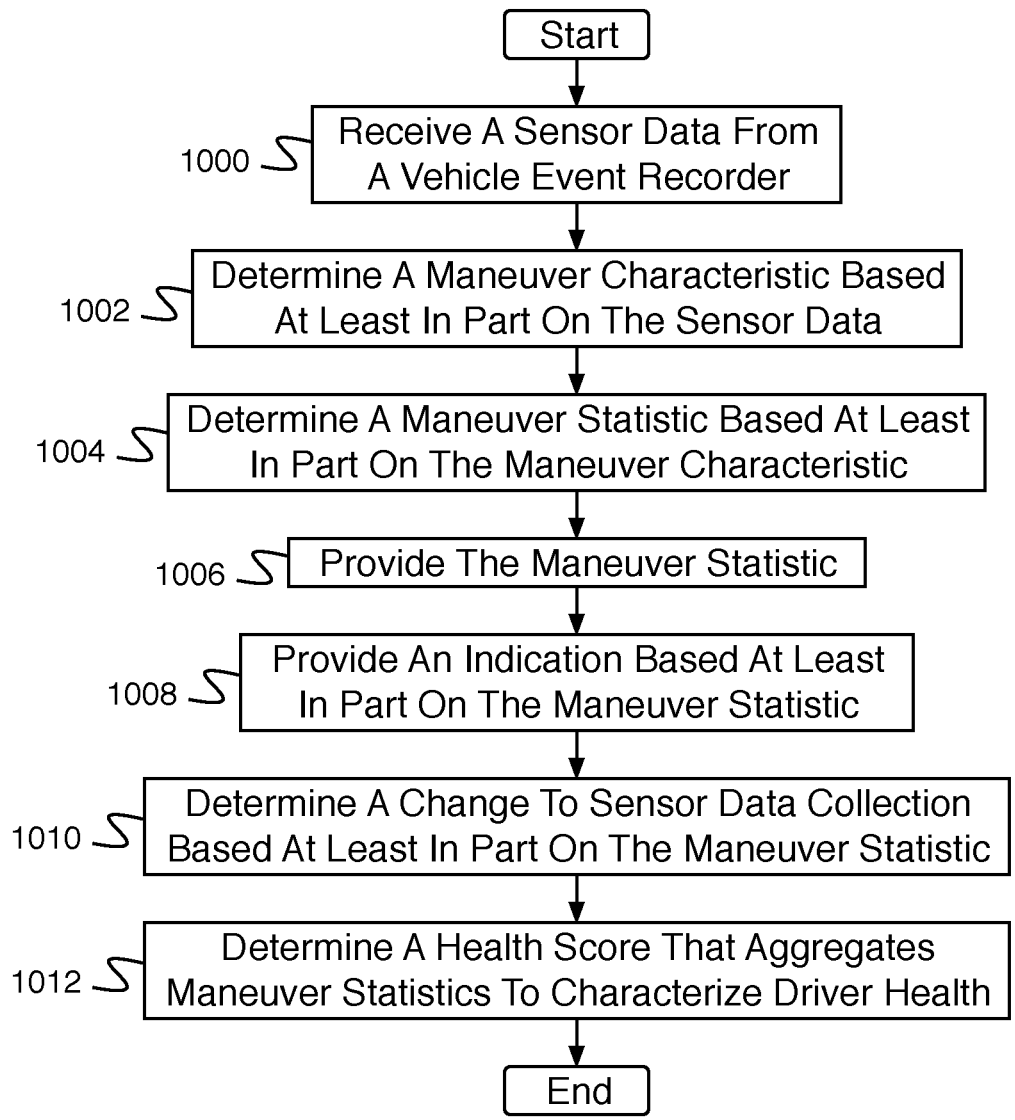
FIG. 10 is a flow diagram illustrating an embodiment of a process for providing an indication.

FIG. 10 is a flow diagram illustrating an embodiment of a process for providing an indication. In various embodiments, the process of FIG. 10 is executed by vehicle data server 104 of FIG. 1, by vehicle event recorder 102 of FIG. 1, by cloud system 110 of FIG. 1, or by any other appropriate system. For example, the process of FIG. 10 comprises a process for providing a driver health indication based at least in part on sensor data. In 1000, sensor data is received from a vehicle event recorder. For example, sensor data comprises video data, internal video data, range finder data, braking data, lane tracker data, GPS data, SONAR data, LIDAR data, etc. Video data comprises video data of traffic lights, road signs, nearby vehicles, vehicles in adjacent lanes, vehicles ahead, vehicles behind, lane markers, a vehicle driver, or a vehicle passenger, etc. Sensor data is received from a vehicle event recorder sensor (e.g., a sensor mounted on a vehicle in conjunction with a vehicle event recorder) or a vehicle sensor (e.g., a sensor included as part of the vehicle).

In various embodiments, sensor data comprises stop cue data (e.g., sensor data comprising an indication to stop, for example, video data of a stop sign or video data of a traffic light), lane change data (e.g., sensor data comprising an indication of a lane change, for example, video data of lane markers, range finder data of adjacent vehicles, laser line tracker data of lane markers, etc.), traffic violation data (e.g., sensor data comprising an indication of a traffic violation, e.g., video data of a traffic violation, speedometer data indicating speed above a speed limit, accelerometer data indicating a vehicle not coming to a stop at a stop sign, etc.), turn characteristic data (e.g., sensor data comprising an indication of a path through a turn, for example, video data indicating a path through a turn, accelerometer data indicating a path through a turn, GPS data indicating a path through a turn, etc.), or any other appropriate sensor data type.

In 1002, a maneuver characteristic is determined based at least in part on the sensor data. In 1004, a maneuver statistic is determined based at least in part on the maneuver characteristic. In 1006, the maneuver statistic is provided (e.g., to a user, to an administrator, to a vehicle event recorder, etc.) In 1008, an indication is provided based at least in part on the maneuver statistic. For example, an indication comprises an indication that the maneuver statistic is within an acceptable range, an indication that the maneuver statistic is not within an acceptable range, an indication that the maneuver statistic indicates dangerous driving, etc. In 1010, a change to sensor data collection is determined based at least in part on the maneuver statistic. For example, a change to sensor data collection comprises a change to a data collection trigger, a change to an event detection threshold, a change to a data collection resolution, a change to a data collection duration, a change to a number or set of sensors collecting data, etc. In 1012, a health score that aggregates maneuver statistics to characterize driver health is determined. For example, a health score comprises a weighted average of maneuver statistics, a nonlinear function of maneuver statistics, an output of a machine learning model based on maneuver statistics, etc.

Figure 11:
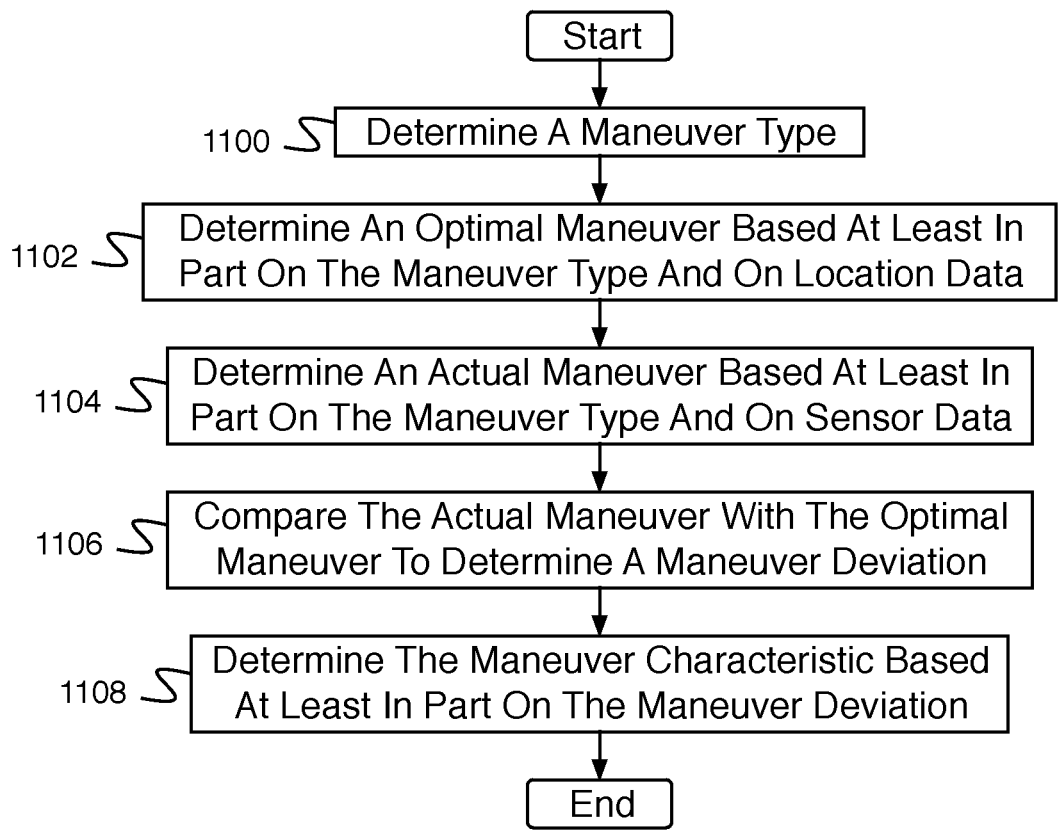
FIG. 11 is a flow diagram illustrating an embodiment of a process for determining a maneuver characteristic based at least in part on sensor data.

FIG. 11 is a flow diagram illustrating an embodiment of a process for determining a maneuver characteristic based at least in part on sensor data. In some embodiments, the process of FIG. 11 implements 1002 of FIG. 10. In the example shown, in 1100, a maneuver type is determined. For example, a maneuver type comprises one or more of a cornering maneuver, a stopping maneuver at a stop sign, a stopping maneuver at a traffic light, a freeway driving maneuver, a following maneuver, etc. In 1102, an optimal maneuver is determined based at least in part on the maneuver type and on location data. In 1104, an actual maneuver is determined based at least in part on the maneuver type and on sensor data. In 1106, the actual maneuver is compared with the optimal maneuver to determine a maneuver deviation. In 1108, the maneuver characteristic is determined based at least in part on the maneuver deviation.

Figure 12:
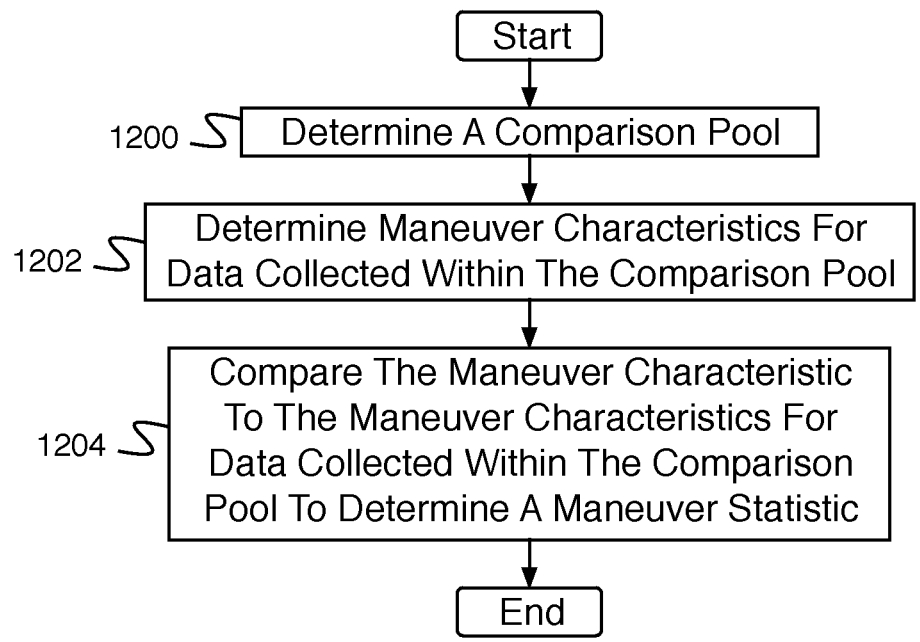
FIG. 12 is a flow diagram illustrating an embodiment of a process for determining a maneuver statistic based at least in part on a maneuver characteristic.

FIG. 12 is a flow diagram illustrating an embodiment of a process for determining a maneuver statistic based at least in part on a maneuver characteristic. In some embodiments, the process of FIG. 12 implements 1004 of FIG. 10. In the example shown, in 1200, a comparison pool is determined. The comparison pool comprises a set of users generating maneuver data comparable to the maneuver characteristic. For example, the comparison pool comprises a group of vehicles of a vehicle type, a group of drivers of a driver type, a group of tenants of a tenant type, or a group of businesses of a business type. In 1202, maneuver characteristics for data collected within the comparison pool are determined. In 1204, the maneuver characteristic is compared to the maneuver characteristics for data collected with the comparison pool to determine a maneuver statistic. For example, comparing the maneuver characteristic to the maneuver characteristics for data collected with the comparison pool to determine a maneuver statistic comprises comparing the maneuver characteristic to the average of data collected with the comparison pool, determining a maneuver statistic percentile within the comparison pool, comparing the maneuver characteristic to a summary of data collected with the comparison pool, or determining a maneuver statistic deviation from a norm within the comparison pool.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a network communication interface configured to:
receive a sensor data from a vehicle event recorder, wherein the vehicle event recorder captures the sensor data in response to a trigger or a threshold; and
a processor configured to:
determine a maneuver characteristic based at least in part on the sensor data;
determine a maneuver statistic based at least in part on the maneuver characteristic;
provide an indication based at least in part on the maneuver statistic;
determine a health score that aggregates maneuver statistics to characterize driver health;
determine a change to sensor data collection based at least in part on the driver health, wherein the change to the sensor data collection comprises a change to the trigger or a change to the threshold, wherein in response to a determination that the driver health is healthier than a previous driver health, the trigger or the threshold is changed to be more sensitive, and wherein in response to a determination that the driver health is less healthy than a previous driver health, the trigger or the threshold is changed to be less sensitive; and
provide, based on the indication, information enabling determining statistics, graphic feedback, or both to a user.

2. The system of claim 1, wherein the vehicle event recorder is mounted on a vehicle.

3. The system of claim 1, wherein the sensor data comprises external video data, internal video data, range finder data, braking data, lane tracker data, GPS data, SONAR data, or LIDAR data.

4. The system of claim 3, wherein the external video data comprises video data of traffic lights, road signs, nearby vehicles, vehicles in adjacent lanes, vehicles ahead, vehicles behind, lane markers, a vehicle driver, or a vehicle passenger.

5. The system of claim 3, wherein the range finder data comprises range data to vehicles in adjacent lanes, range data to vehicles ahead, or range data to vehicles behind.

6. The system of claim 1, wherein the sensor data comprises stop cue data, lane change data, traffic violation data, and/or turn characteristic data.

7. The system of claim 1, wherein the sensor data is received from a vehicle sensor or a vehicle event recorder sensor.

8. The system of claim 1, wherein the sensor data comprises sensor data transferred from the vehicle event recorder to a server system.

9. The system of claim 1, wherein the processor comprises part of the vehicle event recorder, or wherein the processor comprises part of a server system, or wherein the processor comprises part of a cloud system.

10. The system of claim 1, wherein the sensor data is captured in response to a trigger.

11. The system of claim 10, wherein the trigger is associated with a trigger threshold.

12. The system of claim 1, wherein the maneuver statistic comprises an average, a percentile, a summary, or a deviation from a norm.

13. The system of claim 12, wherein the maneuver statistic is with regard to a group, wherein the group comprises a group of vehicles of a vehicle type, a group of drivers of a driver type, a group of tenants of a tenant type, or a group of businesses of a business type.

14. The system of claim 1, wherein the processor is further configured to determine a health score that aggregates maneuver statistics to characterize driver health.

15. The system of claim 1, wherein the processor is further configured to provide the maneuver statistic.

16. A method comprising:
receiving a sensor data from a vehicle event recorder, wherein the vehicle event recorder captures the sensor data in response to a trigger or a threshold;
determining, using a processor, a maneuver characteristic based at least in part on the sensor data;
determining a maneuver statistic based at least in part on the maneuver characteristic;
providing an indication based at least in part on the maneuver statistic;
determining a health score that aggregates maneuver statistics to characterize driver health;
determining a change to sensor data collection based at least in part on the driver health, wherein the change to the sensor data collection comprises a change to the trigger or a change to the threshold, wherein in response to a determination that the driver health is healthier than a previous driver health, the trigger or the threshold is changed to be more sensitive, and wherein in response to a determination that the driver health is less healthy than a previous driver health, the trigger or the threshold is changed to be less sensitive; and
providing, based on the indication, information enabling determining statistics, graphic feedback, or both to a user.

17. A computer program product, the computer program product being embodied in a non-transitory computer readable storage medium and comprising computer instructions for:
receiving a sensor data from a vehicle event recorder, wherein the vehicle event recorder captures the sensor data in response to a trigger or a threshold;
determining a maneuver characteristic based at least in part on the sensor data;
determining a maneuver statistic based at least in part on the maneuver characteristic;

providing an indication based at least in part on the maneuver statistic;

determining a health score that aggregates maneuver statistics to characterize driver health;

determining a change to sensor data collection based at least in part on the driver health, wherein the change to the sensor data collection comprises a change to the trigger or a change to the threshold, wherein in response to a determination that the driver health is healthier than a previous driver health, the trigger or the threshold is changed to be more sensitive, and wherein in response to a determination that the driver health is less healthy than a previous driver health, the trigger or the threshold is changed to be less sensitive; and providing, based on the indication, information enabling determining statistics, graphic feedback, or both to a user.

* * * * *